May 25, 1965 R. B. WADDELL ETAL 3,185,182
REINFORCED FLEXIBLE CONDUIT
Original Filed April 20, 1959 3 Sheets-Sheet 1

INVENTOR.
RUSSELL B. WADDELL JR.
CARROLL H. OSBORN
BY RICHARD DALE MEDFORD

ATTORNEY

May 25, 1965　　R. B. WADDELL ETAL　　3,185,182
REINFORCED FLEXIBLE CONDUIT
Original Filed April 20, 1959　　　　　　　　　3 Sheets-Sheet 2

INVENTOR.
RUSSELL B. WADDELL JR.
CARROLL H. OSBORN
BY RICHARD DALE MEDFORD

*Reuben Wolk*
ATTORNEY

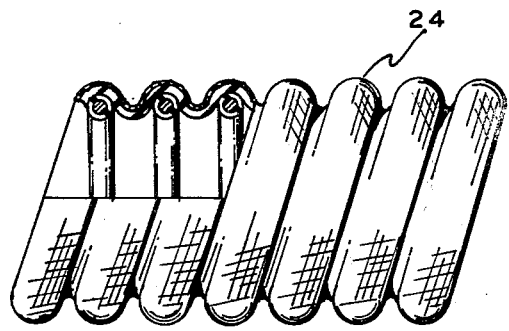
FIG. 9
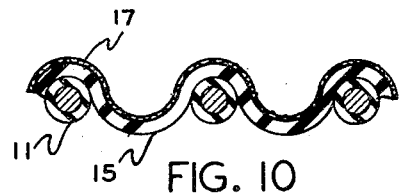
FIG. 10
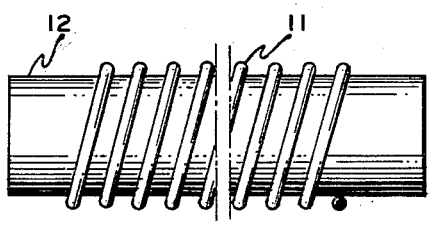
FIG. 11
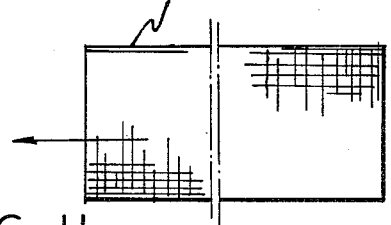
FIG. 14
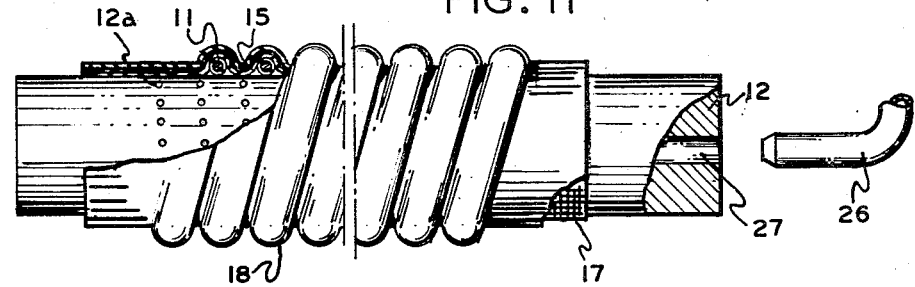
FIG. 13
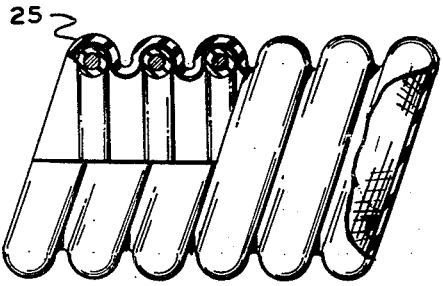
FIG. 12
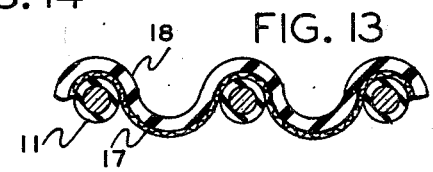

United States Patent Office 3,185,182
Patented May 25, 1965

3,185,182
REINFORCED FLEXIBLE CONDUIT
Russell B. Waddell, Jr., Chesterland, Ohio, and Carroll H. Osborn and Richard Dale Medford, Waynesville, N.C., assignors to Dayco Corporation, a corporation of Ohio
Continuation of application Ser. No. 807,389, Apr. 20, 1959. This application Nov. 16, 1964, Ser. No. 412,881
8 Claims. (Cl. 138—122)

This is a continuation of application Serial No. 807,389, filed April 20, 1959, now abandoned.

The present invention relates to flexible conduit, particularly conduit adapted for use in the transfer of fluids such as used in vacuum cleaners, oxygen and respirating devices, cooling systems, and the like.

More specifically, the present invention relates to conduits having a corrugated tubular body with a plastic coated circumferential reinforcement such as described in Patent Nos. 2,766,806; 2,782,803, and 2,822,857. The device embodied in the present application, however, varies from those just described in that it contains an additional reinforcing member.

As described in the previous patents, it has become increasingly important to provide a flexible conduit which is impervious to leakage of the fluid being transmitted, is light in weight, and is pleasing in appearance. The flexibility requirements for these hoses have been particularly severe, as it is not uncommon for a hose to be bent to an angle of 180 degrees while the fluid is passing through it. The use of a plastic coated circumferential reinforcement was found to provide considerable support to the hose during such extreme conditions and such a hose was able to withstand many repeated flexings without cracking of losing its strength. As described in the previous patents, this reinforcement consisted of axially spaced helical coils formed of a wire coated by a material such as vinyl, with the reinforcement surmounted by a vinyl tube of similar material. Under certain extreme conditions, however, even this conduit would not withstand flexing conditions. For this purpose the device described in the present application was developed as a further improvement of the basic hose previously described. The present hose has been reinforced by the use of a sleeve, or tubular fabric member, particularly a flexible tubular knitted member designated as a stockinet. This stockinet is in circumferential relationship to the reinforcing coil as well as to the plastic tube, and may be mounted directly on the wire or placed upon the plastic tube which surrounds the wire. If desired, it may be further surmounted by an additional plastic tube. It may be bonded or left unbonded to these other members in accordance with other factors, but in any case the resultant product consists of at least one vinyl tube and the stockinet assembled on the helical reinforcement, which thus provides a means of absorbing the stresses imposed on the conduit.

It is, therefore, a primary object of this invention to provide a flexible conduit which is highly resistant to stresses.

It is a further object of this invention to provide such a conduit in which a flexible tubular sleeve provides a reinforcement.

It is a further object of the invention to assemble this conduit in a simple and inexpensive manner.

The invention is further described in the following specification, claims and drawings, in which:

FIGURE 9 is a view of another form of the conduit in which the outer tube has been omitted.

FIGURE 10 is an enlarged sectional view of a portion of the conduit of FIGURE 9.

FIGURE 11 is a view similar to FIGURE 4 illustrating the assembly of still another form of the invention in which the stockinet is applied directly to the helical reinforcement.

FIGURE 12 is an elevational view partially in section illustrating a finished conduit made in accordance with the method of FIGURE 11.

FIGURE 13 is an enlarged sectional view of a portion of the conduit of FIGURE 12.

FIGURE 4 is an elevational view partially in section illustrating a modified method of construction.

Figure 1:
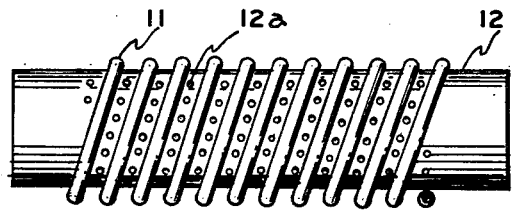
FIGURE 1 is an elevational view of the reinforcing member assembled on a mandrel.

Referring now to the drawings, a helical reinforcement 11 is shown upon a mandrel 12 as a first step in the construction of the novel conduit. As more fully described in the above-mentioned Patent No. 2,766,806, the reinforcement consists of a wire which is coated with a plastic material and formed into the axially spaced coils shown. The mandrel 12 is provided with a plurality of perforations 12a in the outer surface; these perforations are very small in diameter and lead to a central aperture within the mandrel, thus permitting communication between the interior of the mandrel and the outer surface for purposes to be later described.

Figure 2:
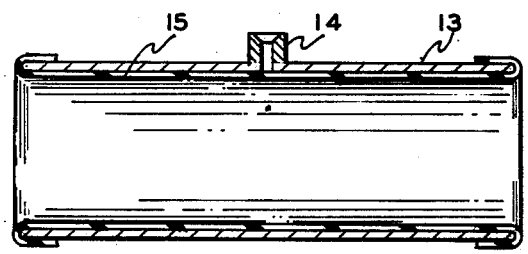
FIGURE 2 is an elevational view in cross section illustrating a flexible tube in a vacuum box.

FIGURE 2 illustrates a vacuum box 13 having an opening 14 in the outer surface through which communication with a vacuum pump may be maintained, and is more fully explained in Patent No. 2,822,857. An elastomeric tube 15 is placed within the inner surface of the vacuum box as shown and cuffed around the ends of the box, vacuum is applied through the opening 14, and thus the tube is caused to expand against the inner wall of the box. The force of the vacuum will thus expand the tube elastically for this purpose. The tube is preferably of an elastomeric thermoplastic material such as vinyl, polyethylene, or any other material having a similar elastic memory; that is, those which are capable of retaining the elastic quality of returning to the original shape after a long period of time. The constituents of such a tube are more fully discussed in the above-mentioned patents. While the exact dimensional relationships of the various members will depend on the type of product ultimately desired, one example of such dimensions would involve a reinforcement having an internal diameter of 1¼ in. to conform with the external diameter of the mandrel. The tube is approximately 1⅛ in. in diameter and 0.25 in. thick, thus providing the necessary tendency for the tube to return to its normal diameter and closely envelop the reinforcing spring as will be shown later.

Figure 3:
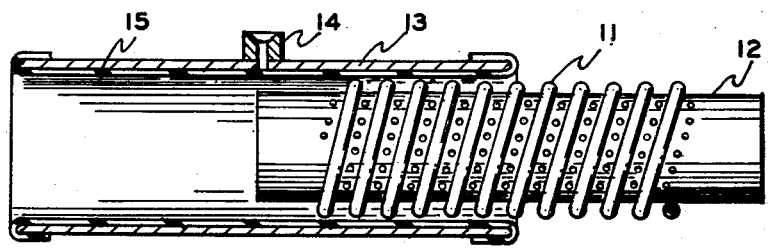
FIGURE 3 is an elevational view in partial cross section illustrating the members of FIGURES 1 and 2 just prior to assembly.
Figure 4:
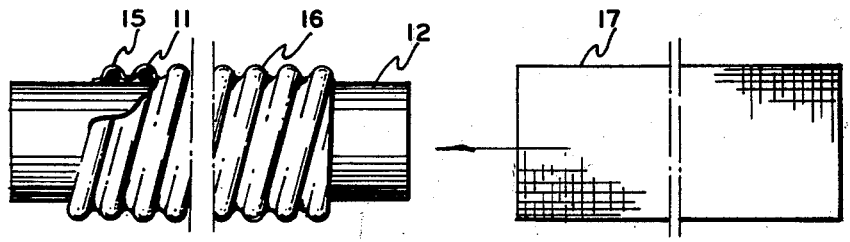
FIGURE 4 is an elevational view in partial cross section illustrating the conduit formed in accordance with FIGURES 1-3 preparatory to the next step in construction.

The next step of the preferred form of procedure is shown in FIGURE 3 in which the reinforcement 11 and the mandrel 12 are placed within the vacuum box 13 while the tube 15 is in its expanded condition. The vacuum force is then released so that the tube tends to return to its original diameter and closely envelop the reinforcement. The resulting assembly 16 will thus be similar to the completed conduit shown in FIGURE 4 of Patent No. 2,822,857. This conduit is further shown in FIGURE 4 of the present application, indicating the next step in the present process. At this point an adhesive or solvent may be applied to the outer surface of the tube 15 if desired. The use of this adhesive will depend upon the exact type of finished product desired and may be used to bond the tube 15 to the inner surface of the next member 17 which is to be applied. The type of cement used is not of inventive importance in the present application, but should be one having the property of bonding vinyl material. The member 17 is next applied by pulling it over the entire assembly as shown in FIGURE 4 and thus snugly embracing the outer surface of the tube. The member 17 is tubular and of flexible fabric, and is known as a stockinet, usually made by knitting, but also by other methods, such as braiding or weaving. The stockinet may be referred to as a longitudinally stretchable tubular fabric member and may be made of yarn composed of any conventional fibers, such as cotton, rayon, nylon, acetate, acrylic or polyester fibers, depending on strength and flexibility characteristics desired. If desired, the stockinet may be made of yarn of mixed fibers, such as cotton-nylon, cotton-rayon, etc., where such combinations result in improved strength, run resistance, or other desirable properties. It is highly important that the stockinet be extremely flexible, and more particularly that it be longitudinally stretchable. This last-named feature is important because the stockinet must be permitted to follow the convoluted shape of the tube rather than remaining straight and stiff. The stockinet just described may be made of simple yarn described above, and placed upon the assembly as shown. On the other hand, the stockinet may be impregnated with such materials as vinyl cement, vinyl latex, vinyl plastisol or vinyl organosol. That is to say, the stockinet after knitting may be coated or impregnated by any of the above materials, or, on the other hand, it may be passed through an extrusion press and coated by means of a vinyl resin. Still another method of providing one of the above coatings could involve treating the fibers or yarns which make up the stockinet with any of the above materials, and then forming the yarn into the stockinet by the conventional knitting or other fabricating methods. Generally speaking, it is preferred that a plain stockinet is used where the cement coating has been applied to the tube 15 as previously described; whereas, a treated stockinet does not require the use of the cement.

Figure 5:
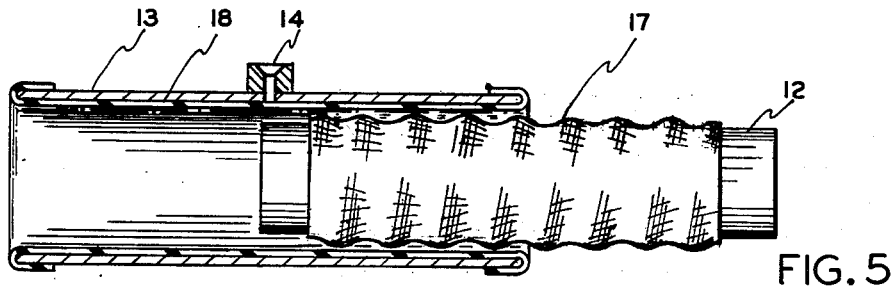
FIGURE 5 is an elevational view in partial cross section illustrating an additional optional step, in which another tube is placed upon the stockinet.

After the stockinet has been applied to complete the assembly, the mandrel 12 containing the components is again placed within the vacuum box 13 as shown in FIGURE 5. A tube 18, which is similar to the tube 15, is placed within the vacuum box and cuffed and expanded as before. Upon release of the vacuum pressure this tube 18 is dropped over the remaining assembly, thus contacting the outer surface of the stockinet 17. The elastic memory of the tube 18 will also tend to provide a slight corrugated effect to the outer surface, and in the case where an adhesive has been applied to the tube 15, there may be sufficient pressure to cause a bond between the outer surface of the reinforcing wire 11 and that portion of the tube 15 which contacts it. However, it is necessary to deepen the corrugations of the conduit in order to provide a more flexible hose, and it may also be necessary to create an improved bond in the finished conduit. In order to accomplish these purposes the entire assembly is mounted in a heating chamber, such as a hot air curing oven 19 which has been partially broken away in FIGURE 6 in order to indicate the relationship of the mandrel and the hose assembly. The mandrel is supported within the oven by means of supports 20 and 21 and a vacuum line 22 is attached to the hollow interior of the mandrel through one end of the oven. The temperature of the oven will depend upon the amount of corrugation desired, the specific type of compounds and resins used in manufacturing the components of the assembly, and the type of coating with may be applied to the stockinet. A range of 275° F. to 400° F. may be expected, while the preferable temperature is approximately 365° F. The amount of vacuum which is applied to the interior of the mandrel will also affect the flexibility of the finished hose, but under normal conditions, a vacuum of approximately 10 in. of water is applied. The time of heating is usually in the neighborhood of twenty minutes but again may be somewhat longer or shorter in duration. The heating process will soften the tubes 15 and 18 sufficiently to permit them to be drawn radially inward by the vacuum and thus accentuate the corrugated shape created by the use of the reinforcement 11. At the same time a bond will occur in every instance along the individual reinforcements because of the greater pressure which exists there. In certain instances a complete bond will occur among the contacting surfaces of the tubes and stockinet to unify all components, and in the case of more elevated temperatures a slight flow of plastic may occur and fuse all components into a unitary mass. It should be noted that the drawings will indicate separate layers. In other instances there may be a bond between the stockinet and the inner tube only, in the area between the coils of the reinforcement, or between the stockinet and the outer tube only. The specific nature of the bonding will depend on whether adhesive has been applied to the inner tube or whether the stockinet has been coated completely or on one surface. It may also depend, as stated above, on the exact temperature to which the assembly is exposed.

Figures 7, 8:
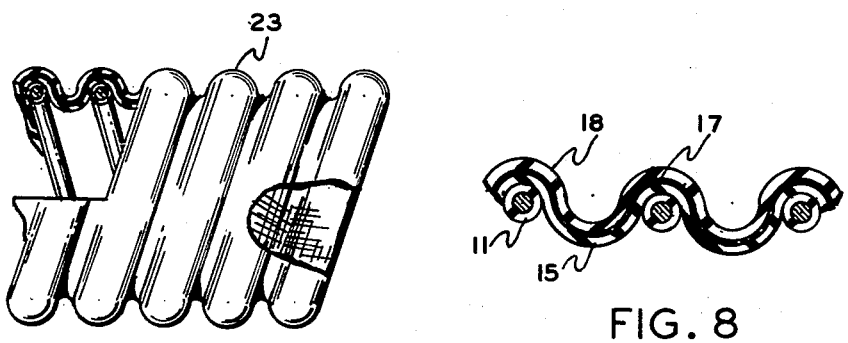
FIGURE 7 is an elevational view in partial cross section illustrating a preferred form of the novel conduit after complete construction.
FIGURE 8 is an enlarged sectional view of a portion of the conduit of FIGURE 7 illustrating more clearly the relationship of the components.

FIGURES 7 and 8 illustrate a completed conduit 23 which represents a preferred form of the present invention consisting of inner and outer tubular members 15 and 18 and a stockinet 17. As stated above, complete bonding between turns may be effected or bonding may occur only at the point where the convolution meets the inner tube. When the complete bond exists there is a tendency to decrease the flexibility of the tube while the life of the tube itself is increased. On the other hand, the bonding at certain points only will tend to provide a more flexible tube while decreasing the life thereof.

The optical effects of the completed hose assembly are quite varied and worthy of reference. For example, the outer tube may be opaque, and thus hide the stockinet from view as shown in FIGURES 7 and 8. On the other hand, the outer tube may be transparent or translucent in order to render the stockinet and the coils of the reinforcement visible, thus creating varicolored effects. In connection with this, it has been found that a white inner tube and a translucent colored outer tube provide a pleasing effect and also permit an easier color match of the outer tube to surrounding structure. This may be desirable, for example, in matching a hose to a vacuum cleaner.

An alternative form of the invention is illustrated in FIGURES 9 and 10 in which a conduit 24 is illustrated. In this case the conduit 24 consists of the same reinforcement 11, inner tube 15, and stockinet 17 that have been previously described, but the outer tube has been omitted. Preferably, this form of conduit should be made by using a stockinet that has been coated as described above in order that a complete bonding of the stockinet to the tube may occur. This hose is made by following the steps illustrated in FIGURES 1–4 but omitting the step of FIGURE 5. While it is also desirable that this hose be completed in accordance with the showing of FIGURE 6, it is possible that the step of heating may be omitted if an adhesive coating is applied to the tube 15 and a stockinet is adhered by this means.

Figure 6:
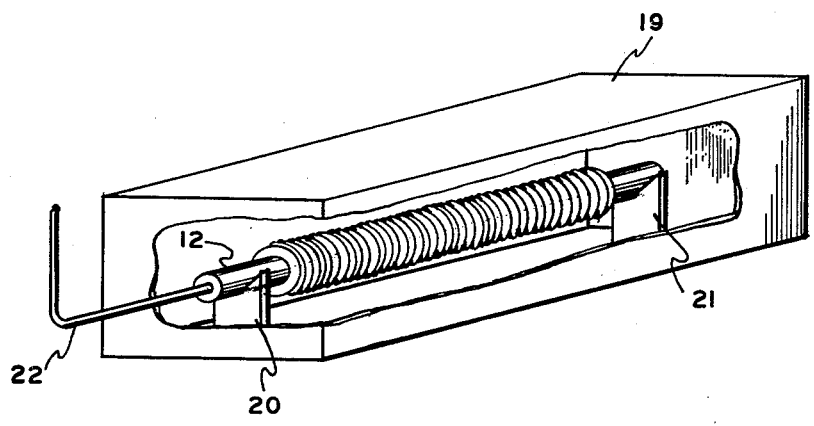
FIGURE 6 is a perspective view, partially broken away, illustrating a final processing of the novel conduit.

Still another form of the invention is illustrated in FIGURES 11–13. In this form of the invention the stockinet 17 is shown in FIGURE 11 as being applied directly over the reinforcement 11, thus omitting the inner tube. The outer tube is applied exactly as shown in FIGURE 5 and the final step is as shown in FIGURE 6, and the resulting conduit 25 is shown in FIGURES 12 and 13. In this case, where the inner tube is omitted, the stockinet is bonded directly to the outer periphery of the turns of the reinforcement and the outer tube 18 is bonded at the same point, or, as in the previous instances, it is completely bonded along the surface of the stockinet.

FIGURE 14 illustrates an alternative method of manufacturing a conduit similar to the conduit 23 shown in FIGURE 7. The reinforcement 11 and tube 15 have been assembled over the mandrel 12 exactly as described above with reference to FIGURES 1–3. In this modification, however, it is desirable to relieve the stresses of the stockinet 17, perhaps because the stresses have been created when the stockinet is assembled. The stockinet and the tube 15 are therefore placed so that their ends extend about 6 in. beyond the ends of the reinforcement, and the outer tube 18 is then placed on the stockinet with its ends in alignment with the inner tube and stockinet, as shown in FIGURE 14. Air is then blown into the interior of the mandrel 12 by means of an air hose 26, or other conventional source. The air pressure is transmitted through the internal passage 27 and the perforations 12a, raising the assembly of tubes and stockinet from the mandrel sufficiently to float the components free from the mandrel. This relaxes the loops of the stockinet and the stresses in the tubes, thus allowing them to shrink back. The air pressure is continued until the ends of the stockinet and tubes are in alignment with the ends of the reinforcement.

By means of the inventive process described herein a novel conduit may be evolved in which the basic tube and reinforcement structure are considerably reinforced by means of the stockinet or other type of tubular fabric. Applicants have provided for the first time a method of vacuum forming a hose including this stockinet. In the prior art it has always been found necessary to use pressure molding or "cording" procedures. By the use of this process the inherent advantages of the flexibility and economy which exist in the plastic materials are fully utilized. Further, applicants have found that the use of a longitudinally stretchable stockinet permits the convoluted form to be maintained. Without this stretchability a stiff reinforcement would exist which would limit the flexibility of the finished product. The advantage of this stretchability lies in the fact that the tubular stockinet is stretched over the convolutions and thus the adjacent courses or wales of the stockinet are more widely spaced where they pass over the ridges than in the valleys between the turns of the reinforcement.

The term "bonding" as used in this application refers to either the fusing of components by means of heat, or joining these components by means of adhesive or solvents, as more fully described above.

The specific forms of the invention described and illustrated are not meant to be limiting upon the scope of the invention, but are exemplary of the basic inventive concept.

We claim:
1. A reinforced flexible corrugated conduit comprising a helical reinforcement of plastic coated wire having axially spaced coils, an elastomeric tube bonded to said coils, a longitudinally stretchable but unstressed tubular fabric member enveloping said tube, and a second elastomeric tube enveloping said member.

2. A reinforced flexible corrugated conduit comprising a helical reinforcement of plastic coated wire having axially spaced coils, and at least one elastomeric tube and a longitudinally stretchable but unstressed tubular fabric member assembled outwardly of said reinforcement in concentric relationship thereto.

3. The conduit of claim 2 in which said tube is bonded to said coils.

4. The conduit of claim 2 in which said tube and said member are bonded to said coils.

5. The conduit of claim 2 in which said tube and said member are bonded to each other and to said coils only at the area of contact between said coils and said member.

6. A method for the manufacture of reinforced flexible corrugated conduits comprising the steps of forming a helical reinforcement, successively placing a first tube of elastomeric material, a tubular reinforcing member, and a second tube of elastomeric material around said reinforcement, with the ends of said tubes and said member in alignment with each other and extending beyond the ends of said reinforcement, and applying internal pressure to the resulting assembly to align the ends of said tubes and said member with said reinforcement.

7. The method of claim 6 including the steps of applying radially inward pressure and heat to said assembly to provide a corrugated configuration and at least a partial bond of the components of said assembly.

8. The method of claim 7 in which said pressure is applied by reducing the internal pressure of said assembly.

No references cited.

LEWIS J. LENNY, *Primary Examiner.*

UNITED STATES PATENT OFFICE
CERTIFICATE OF CORRECTION

Patent No. 3,185,182                                              May 25, 1965

Russell B. Waddell, Jr., et al.

It is hereby certified that error appears in the above numbered patent requiring correction and that the said Letters Patent should read as corrected below.

Column 2, line 29, for "FIGURE 4" read -- FIGURE 14 --;
same column 2, line 65, for "0.25" read -- .025 --.

Signed and sealed this 12th day of October 1965.

(SEAL)
Attest:

ERNEST W. SWIDER                                  EDWARD J. BRENNER
Attesting Officer                                        Commissioner of Patents